(12) United States Patent
Dyatlov et al.

(10) Patent No.: US 7,979,690 B1
(45) Date of Patent: Jul. 12, 2011

(54) SYSTEM AND METHOD FOR BOOTING A COMPUTER FROM BACKUP

(75) Inventors: Dennis S. Dyatlov, Moscow (RU);
Maxim V. Lyadvinsky, Moscow (RU);
Juri V. Tsibrovsky, Moscow (RU);
Serguei M. Beloussov, Singapore (SG)

(73) Assignee: Acronis Inc., Tortola (VG)

( * ) Notice: Subject to any disclaimer, the term of this patent is extended or adjusted under 35 U.S.C. 154(b) by 736 days.

(21) Appl. No.: 12/115,834

(22) Filed: May 6, 2008

(51) Int. Cl.
*G06F 9/24* (2006.01)
*G06F 15/177* (2006.01)
*G06F 11/00* (2006.01)

(52) U.S. Cl. ........ 713/2; 713/1; 714/2; 714/6.2; 714/42; 711/161; 711/162

(58) Field of Classification Search ............... 713/1, 2; 714/2, 6.2, 42, 161, 162; 711/161, 162
See application file for complete search history.

(56) References Cited

U.S. PATENT DOCUMENTS

| | | | | |
|---|---|---|---|---|
| 5,163,148 A | * | 11/1992 | Walls | 711/162 |
| 6,073,220 A | * | 6/2000 | Gunderson | 711/162 |
| 6,158,002 A | * | 12/2000 | Kwan et al. | 713/2 |
| 6,345,346 B1 | * | 2/2002 | Biessener et al. | 711/162 |
| 7,353,355 B1 | * | 4/2008 | Tormasov et al. | 711/165 |
| 2006/0271819 A1 | * | 11/2006 | Cluff et al. | 714/15 |
| 2007/0038821 A1 | * | 2/2007 | Peay | 711/162 |
| 2007/0055853 A1 | * | 3/2007 | Hatasaki et al. | 713/1 |

* cited by examiner

*Primary Examiner* — Vincent T Tran
(74) *Attorney, Agent, or Firm* — Bardmesser Law Group

(57) ABSTRACT

Method for booting from a backup, including loading an initialization application that identifies a storage with a backup; activating a handler of a BIOS interrupt module, for intercepting boot loader requests to the storage, and for redirecting them to the backup; creating a bitmap of the blocks in the backup and of a writable storage device to which new data will be written; initiating the BIOS to load and execute boot blocks from the backup; transferring control to a routine defined by a boot record in the boot blocks; activating an I/O filter for intercepting requests to the writable storage device; for write requests, the filter writes a corresponding block to the writable data storage, and marks this block in the bitmap; for read requests, the filter checks the bitmap if this data block was unchanged, and redirects the read request to the backup, otherwise, the filter redirects the read request to the writeable storage device.

17 Claims, 6 Drawing Sheets

SYSTEM AND METHOD FOR BOOTING A COMPUTER FROM BACKUP

BACKGROUND OF THE INVENTION

1. Field of the Invention

The present invention is related to booting a computer system from backup, and more particularly, to working with backed up data without restoration of the data to the data storage device of computer system. The present invention is also related to writing data to the backup, which can be stored on a hard disk drive, a CD/DVD writeable/rewritable disk, on a flash drive, or on a network data storage device; to an incremental backup, or to any type of the writable data storage device.

2. Description of the Related Art

Conventionally, a backup is a copy of data of the data storage device. A copy of the data can be used to restore the original state of the data storage device after a data loss event, such as computer system failure. In general, backups are used for two purposes: for restoring a computer system to a previous state, and for restoring selected files from backup.

After a file system failure, for example, the computer system cannot be started. In this case, it is necessary to boot up the computer from the other bootable media, such as a bootable CD/DVD, to restore the file system or install the OS and the necessary software on the computer system, or both.

In this case, the CD/DVD can contain software for installing an OS or a previously backed up state of the data storage device of the computer system. In each of these cases, it takes some time to restore operation of the computer system. In corporate networks, a typical server can have 200-500 Gigabytes (or, frequently, much more than that) of data. With a transfer rate up to 100 Megabytes per second over a network, it would take over 2,000 seconds to transfer all the data from the backup storage to the server's local storage. This assumes that the entire network bandwidth is available for this process. Frequently, this is not the case, since only a fraction of the bandwidth may actually be available at any given time for restoring the files from backup. In practice, such transfers of data from backup to the server can take many hours.

Also, even 2,000 seconds of downtime is an extremely long time, particularly for many mission-critical applications. For example, if the server in question is a web server that handles customer requests or sales, a period of 20-40 minutes of downtime can result in substantial lost sales.

But if data from the backup cannot be restored to the data storage device, or if the user wants to work with the data in the backup, but does not want to restore a computer using that data (for example, when the data storage device is corrupted and must be replaced, but another data storage device is not available now, or when the computer system has no data storage device and works via a network with a file system that is installed on the other computer system, such as server), then the storage media with the backup and the additional environment can be used, which provides the computer system working with the backup a data storage media from which it can be rebooted.

In other words, there is a need in the art to boot the computer system using the data in a previously created backup, read the data from the backup as if from the usual data storage device, write data both to the backup, if it is located on the writeable data storage device, and to the incremental backup, and to the any writeable data storage device, such as CD/DVD writeable/re-writeable disk, hard disk drives, flash drives, tapes, network data storage devices, and others.

SUMMARY OF THE INVENTION

Accordingly, the present invention is related to booting a computer system from the backup, and more particularly, to working with backed up data without its restoration to the data storage device of computer system, that substantially obviates one or more of the problems and disadvantages of the related art.

In one aspect, there is provided a system, method and computer program product for booting a computer system from backup, including loading an initialization application to run in a single thread mode and that identifies a storage media with the backup that includes boot blocks; installing and activating a handler of a Basic Input/Output System (BIOS) interrupt module, for intercepting boot loader requests to the storage media, and for redirecting them to the backup; creating a bitmap of the data blocks stored in the backup and of a writable data storage device to which new data will be written; initiating the BIOS to load and execute the boot blocks from the backup; transferring control to a routine defined by a boot record stored in the backup's boot blocks; installing and activating an I/O filter for intercepting the requests to the writable data storage device, and after a write request is received, the I/O filter writes a corresponding data block to the writable data storage, and marks this data block in the bitmap to indicate that this block is stored on the writable storage device; after a read request is received, the I/O filter checks the bitmap to see if this data block was not changed, and redirects the read request to the backup to read the data block, and if the requested data block was changed and written to the writeable data storage device, then the I/O filter redirects the read request to the written blocks on the writeable data storage device.

At least one incremental backup is created from the data blocks written to the writeable data storage device. The backup is editable, such that data blocks in the backup are replaceable by substitute data blocks, and new data blocks can be added. The writable data storage device and the backup form a single address space and are represented by a virtual data storage. A graphical user interface is used to select a backup, out of multiple backups, for booting up. The backup is a block-level backup. The backup for booting is an incremental backup of the data storage device. The backup can include an operating system, and/or a snapshot of the data storage device, and/or a hiberfile. The booting can be performed over a network. The graphical user interface (GUI) is started by the initialization application to searching and selecting the data storage device(s) with stored backup to boot from. Computer system service data stored in the backup is updated during the booting. The backup can be stored on a remote storage device, and the bootup can be performed over a network. Multiple computer systems can be booted from the same backup.

Since the I/O filter, once started, handles data storage device access requests, in one embodiment, by substituting a new interrupt handling routine for the standard one, the system will be able to use the so called above virtual data storage and continue the booting procedure, so as work in standard routine. From the perspective of the hardware, the virtual data storage (virtual HDD or virtual volume) will be treated as if it were an integral local hard drive.

Moreover, through described mechanisms, a virtual storage device is created and, during and after booting of the computer system, all updates would be directed to that virtual storage device since the I/O filter used to interface to the data storage is updated accordingly.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings.

The present invention is related to booting a computer system from backup, usually referred to as an "backup", and more particularly, to working with backed up data without having to restore it to the data storage device (e.g., an HDD) of a computer system. The present invention is also related to writing data to the backup, stored on a hard disk drive, a CD/DVD writeable/rewritable disk, on a flash drive, or on a network data storage device, to an incremental backup, and to any type of writable data storage device.

Figure 1:
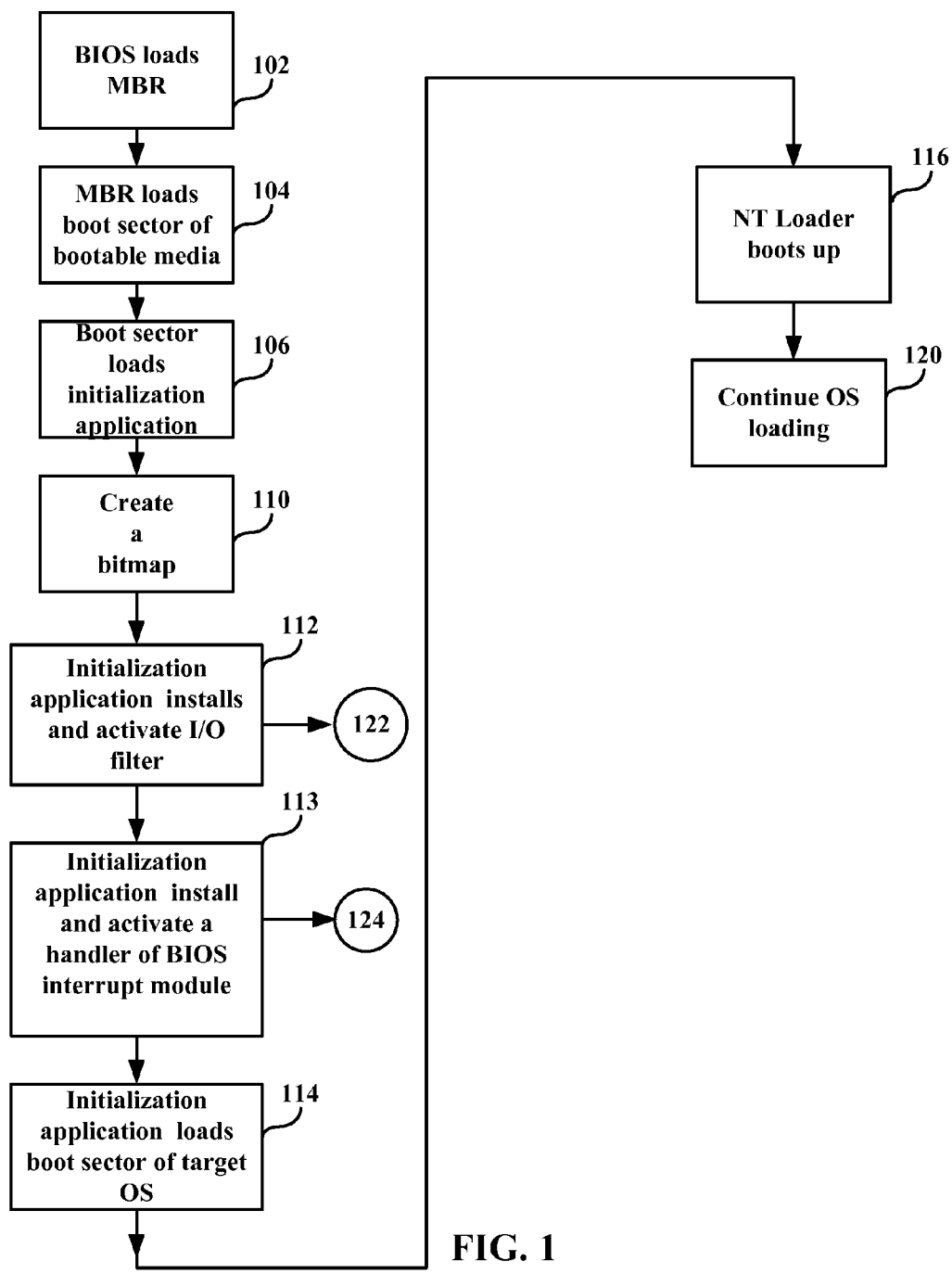
FIG. 1 illustrates one exemplary embodiment of the present invention.

FIG. 1 illustrates one embodiment of the present invention. Modern operating systems are stored on hard disks, flash drives, or other non-volatile storage devices. When a computer is powered on for the first time, it does not have an operating system in its memory. The computer's hardware alone cannot perform complex actions, such as a loading a program from disk, so a special small program, called a bootstrap loader, a bootstrap or boot loader, is used. This program's job is to load other software for the operating system to start. Often, multi-stage boot loaders are used, in which several small programs of increasing complexity are sequentially invoked one after the other, until the last of one loads the operating system.

In modern computers, the bootstrapping process begins with the CPU executing software contained in read-only memory (ROM), for example, the BIOS of an IBM PC, or EFI of a PowerPC-based Apple Macintosh computers, at a pre-defined address. For simplicity, "BIOS" here will refer to both BIOS and EFI. The boot process is considered complete when the computer is ready to interact with the user, or the operating system is capable of running ordinary applications. The boot device is the device from which the operating system is loaded. A modern PC BIOS supports booting from various devices. These include the local hard disk drive (or partitions on a hard disk), floppy, optical disc drive, a SCSI device, Zip drive, LS-120, a network interface card using PXE and a USB device (USB-FDD, USB-ZIP, USB-CDROM, USB-HDD, USB flash drive).

In step 102, the system which will be working with the backed-up OS, is booted up.

Upon startup, the computing system's CPU runs the instruction located at the BIOS. It contains a jump instruction that transfers control to the location of the BIOS start-up program. This program initializes devices that the computer will rely on during operation.

Then (step 104), the BIOS loads and executes the boot sector of the bootable device, such as CD/DVD disk, flash drive, hard disk drive (HDD), or other. In the case of a bootable media, such as HDD, this is referred to as the master boot record (MBR). The MBR code in turn loads HDD sectors for further execution (step 106). In the case of a non-partitioned device, a volume boot record will be used. In the preferred embodiment, the boot sectors themselves, or in combination with additional sectors, may contain an initialization application or procedure, which can run in a single thread mode since it has minimal functionality and in some cases does not require any operating system kernel for execution. In effect, the initialization application can be viewed as a substituted loader procedure (driver) that may be somewhat analogous to DOS programs that do not require an operating system kernel, or even an operating system, to run.

Such an initialization application can be an application, which identifies media with the backup of the data storage with the boot blocks, for example, data storage with the installed OS and applications.

In step 110, a bitmap of the data blocks stored in the backup and on the writable data storage (to where data will be written) is created. Using the bitmap, upon a disk access request, it is determined whether the particular data block that is being accessed in the backup has already been changed (written/rewritten), or updated during operation of the computing system, or whether the corresponding sector is still located in the backup. The access can be executed using a storage area network, a local area network or any other mechanism available for accessing remote storage, if the writable media or the backup is located on another machine.

In step 112, the initialization application installs in memory and activates the I/O filter, which accesses to I/O devices, physical devices, such as disk drives, disk partitions, logical drives or logical partitions, or their combinations. Applications address the writable data storage device and the backup (the same way they would address virtual data storage) as a single address space, although the processing of the requests may require readdressing of the requests either to the disk being restored or to the disk backup, based on the procedures discussed below.

Figure 3:
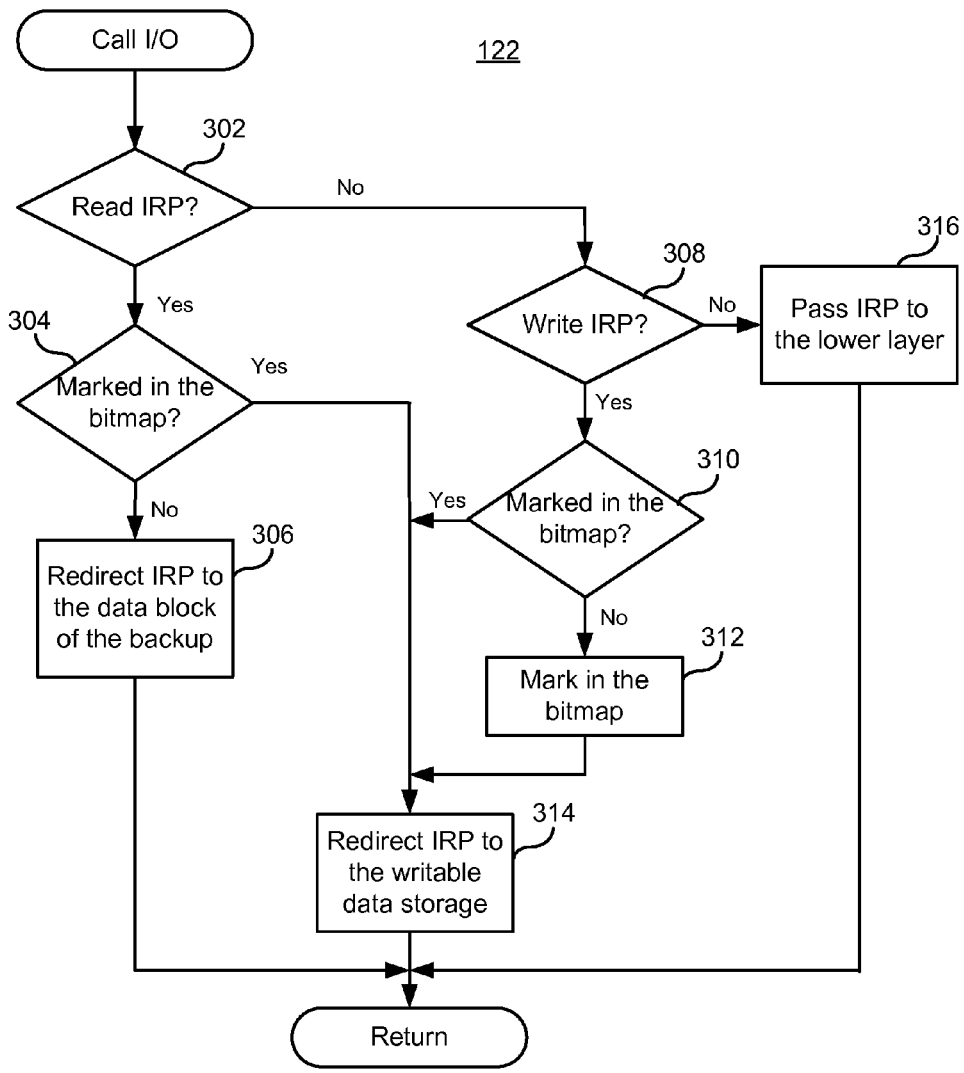
FIG. 3 illustrates the process of handling IRPs in the present invention.

The functioning (122) of the I/O filter is further illustrated in FIG. 3.

Figure 2:
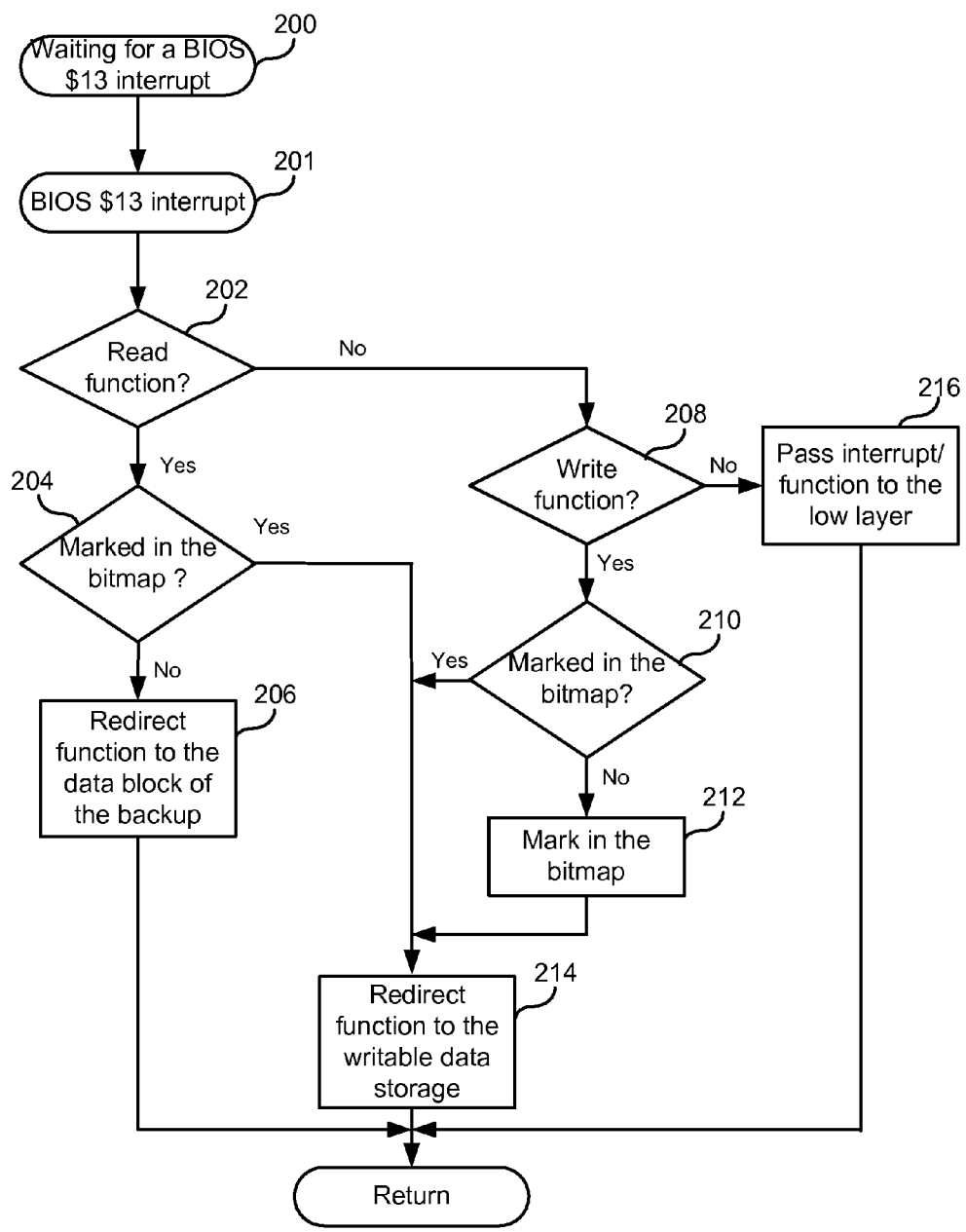
FIG. 2 illustrates the process of handling BIOS interrupts in the present invention.

Then, in step 113, the initialization application installs in memory and activates a handler of BIOS interrupt module, which interrupts the boot loader requests, for example, BIOS or EFI requests, to the media from which it is booting up, and redirects them to the data blocks stored in the backup. The processing (124) of boot loader requests by a handler of BIOS interrupt module is illustrated in FIG. 2.

In step 114, the initialization application initiates the BIOS loads and executes the boot sector from the backup. After that, the initialization application transfers control to a routine defined by MBR (in case the backup consists of, for example, a snapshot of the hard disk drive), keeping in mind that a handler of BIOS interrupt should be loaded. As a result, the operating system then boots from the backup. Next, in step 116, the OS loader (e.g., NT loader) loads at least one of boot drivers (for example, such as those used for the Windows NT or Windows XP operating systems).

It should be noted that BIOS' of most computing systems provide the possibility of assigning priority of bootable devices. In this case, it may be useful to provide correct booting and rebooting of the computer system in BIOS settings.

Note that the description herein is applicable to the Intel X86 architecture, AMD64, IA-64 and EFI. Other processor architectures and operating systems have slightly different approaches, although the general principle is essentially the same, and are intended to be covered by this description.

If the data blocks stored in the backup are compressed, then the compressed data needs to be decompressed, and then the boot loader can read necessary data from the media.

The backup (compressed or not compressed block level backup of the data storage device) is visible to the boot loader as a "normal" bootable block storage.

Since the I/O filter once started, handles data storage device access requests, in one embodiment, the system will be able to use the virtual data storage and continue the booting procedure (step 120), same as in a standard routine. From the perspective of the hardware, the virtual data storage (or virtual HDD) will be treated as if it were an integral local hard drive.

Moreover, through described mechanisms, a virtual storage device can be created and, during and after the booting of the computer system, all updates would be directed to that virtual storage device, since the I/O filter used to interface to the data storage is updated accordingly.

Also a disk level filter can be added. The disk level filter may be implemented as a separate module (essentially, a kernel mode driver) that is installed in addition to the standard disk driver and filters or intercepts all I/O requests passed to the low-level disk driver. For example, the disk level filter may be layered in-between the low-level disk driver and the file system that sits above it. In some circumstances, this approach may be preferred, for performance reasons and is functionally equivalent to disk driver substitution. Similarly removing of the disk level filter is equivalent to restoring original disk driver.

The virtual HDD in some sense corresponds to the original HDD of the machine (or, optionally to only certain partitions of it). Another way to view this is that this procedure ensures that disk drive I/O is addressed correctly, to the virtual HDD rather than to the local HDD or some other "incorrect" storage device.

FIG. 2 illustrates the process of handling BIOS interrupts. As shown in FIG. 2, the process remains in a waiting mode when no BIOS $13 interrupt are generated by BIOS. After receiving a BIOS $13 interrupt (BIOS h13 interrupt) to the virtual data storage, in step 201, the process goes to step 202, where the process checks if the function of BIOS 13$ interrupt is a read function (for example, 02h, 0Ah or 0Eh BIOS interrupt functions). If it is a read function, then, in step 204 the process checks if the particular storage unit is marked in the bitmap (which indicates which blocks (e.g., a cluster) of the virtual data storage were modified) and corresponding modified data is stored in the writable data storage. If the answer is no, then the read function is redirected to the data block of the backup in step 206. The process then returns to step 200. If, in step 204, the storage unit is recognized as being marked in the bitmap, then the access function is redirected to the writable data storage in step 214. The process then returns to step 200.

If, in step 202, the function of BIOS interrupt is not a read function, then the process checks if the function is a write function (such as 03h, OBh and OFh BIOS interrupt functions) in step 208. If it is not a write function, then, in step 216, the function is passed to the lower layer, and the process returns to step 200. Note that the backup and writable data storage can all "live" on the same physical drive, either as an entire drive, or as files or folders or partitions. Thus, other functions are passed to any preassigned physical storage or backup.

Also note that other functions of BIOS interrupt can work with a data storage device, such as receiving of the disk parameters (08h), receiving a type and size of the disk (15h), positioning a head of the disk (OCh), or others, and can access the data storage device without calling the read/write functions of the BIOS interrupts described above. In this case, such functions also can be intercepted and redirected to the corresponding data block of the backup.

If, in step 208, the function is a write function, then the process checks if the storage unit is marked in the bitmap (step 210). If it is, then the process proceeds to step 214, as described above. If it is not, then the storage unit is marked in the bitmap (step 212) and the process proceeds to step 214, and data is written to the corresponding block of the writable data storage.

In other words, all attempts to write to the backup are redirected to the writable data storage. The system itself does not "know" that the storage it is accessing is the writable data storage, rather than a backup.

Also note that if the backup is one that is opened for editing (i.e., new data blocks can be added to the backup, or old data blocks in the backup can be replaced by the new data blocks), then the all attempts to write to the backup are redirected to the backup, but such backup must be located on the data storage, to which data can be written, i.e., writable media.

FIG. 3 illustrates the process of handling IRPs (see 122 in FIG. 1). As shown in FIG. 3, the process stays in a waiting mode when no IRPs are generated by system utilities or by a user application. After receiving an IRP directed to the virtual storage, in step 302, the process first checks if the IRP is a READ IRP. If it is a READ IRP, then, in step 304 the process checks if the particular storage unit is marked in the bitmap (which indicates which blocks (e.g., a cluster) of the virtual data storage was modified and corresponding modified data is stored in the writable data storage. If the answer is no, then the IRP is redirected to the backup in step 306. The process then returns back to step 302. If, in step 304, the storage unit is recognized as marked in the bitmap, then the access request is redirected to the writable data storage in step 314. The process then returns to step 302.

If, in step 302, the IRP is not a READ IRP, then the process checks if the IRP is a WRITE IRP (step 308). If it is not a WRITE IRP, then, in step 316, the IRP is passed to the lower layer, and the process returns to step 302. Note that the backup and writable data storage can all "live" on the same physical drive, either as an entire drive, or as files or folders. Thus, other IRPs are passed to any preassigned physical storage or backup.

If, in step 308, the IRP is a WRITE IRP, then the process checks if the storage unit is marked in the bitmap (step 310). If it is, then the process proceeds to step 314, as described above. If it is not, then the storage unit is marked in the bitmap (step 312) and the process proceeds to step 314, and data is written to the corresponding block of the writable data storage.

In other words, all attempts to WRITE to the backup are redirected to the writable data storage. The system itself does not "know" that the storage it is accessing is the writable data storage, rather than it backup.

Figure 4A:
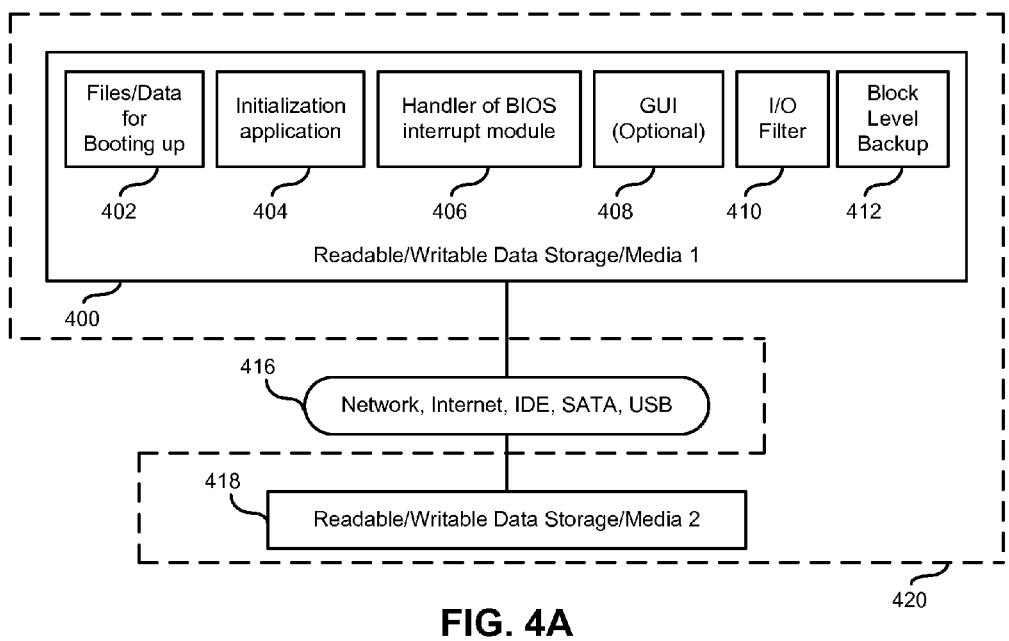
FIG. 4 illustrates exemplary computer readable and writable data storage devices in which the invention can be implemented.
Figure 4B:
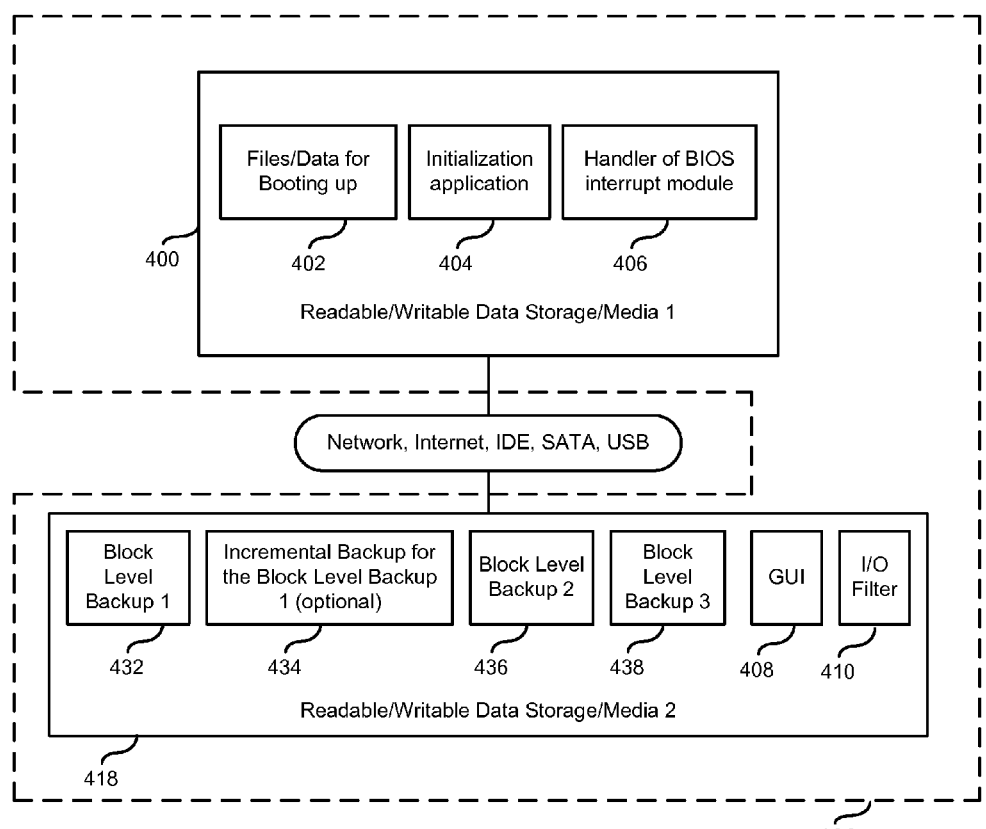

FIGS. 4A and 4B illustrate exemplary computer readable and writable data storage devices in which the invention can be implemented.

Referring to FIG. 4A, the data storage (media) 1 400 can store a files/data 402 for booting up a computer system. For a bootable media, such as HDD, these data can be the master boot record (MBR), whose code in turn loads HDD sectors for further execution, for example, for loading an initialization application. For a non-partitioned device, it is a volume boot record. An initialization application 404, stored on the data storage media 1 400, can be an application, which can point media with the backup of the data storage with the boot blocks. An initialization application 404 also can: (a) start the handler of BIOS interrupt module 406, which is illustrated in FIG. 2, and which is interrupt the boot loader requests; (b) decompress the data blocks stored in the backup (412); create a bitmap of the data blocks stored in the backup 412 and on the readable/writable data storage/media 2 (418); (c) install and start the I/O filter 410, initiate the BIOS loads, and execute the boot sector from the backup.

Also the data storage (media) 1 400 can store graphical user interface (GUI) 408, which can be started by the initialization application 404. The GUI can include tools for searching or selecting the data storage device with stored backup to load, if it is not pointed to by the initialization application 404. Note, that the searching for selecting the data storage device with the stored backup to load can be done by pointed to it by the initialization application 404.

After the start of the boot, the computer system can write data to the readable/writable data storage 418. Such readable/writable data storages can include, e.g., an HDD, flash memory, writeable/rewritable compact disk, digital versatile disk, network disk, and others.

The access to a readable/writable data storage (writable media) 2 418, which acts as virtual data storage 420, can be executed using a storage area network, a local area network or any other mechanism available for accessing remote storage, if the writable media or the backup is located on the other machine. Also the data storage 400 can be writable, so new data can be written to the data storage 400, and the readable/writable data storage 418 is not necessary to computer system operation. Note that the backup can be editable, so new data can be written in it. Also note that the readable/writable data storage 418 can be part of the data storage 400, for example, other volume of the hard disk drive.

The readable/writable data storage 418 can be connected, but not limited, to the data storage 400 via network, IDE, SATA interfaces, USB interface, or can be part of the data storage 400.

Referring to FIG. 4B, any type of the backup with the installed OS can be used for loading a computer system, for example, incremental backup 434 and/or full backup 432. Also one of the backup can be used for booting up the computer system, for example, a block level backup 2 (436) or block level backup 3 (438).

If an incremental backup is selected for boot up, the process of the boot up is not any different from the boot up process described above, with the exception of process of working with the incremental backups.

An incremental backup is a backup method where several backups are stored. These backups is the incremental if each original piece of backed up data is stored only once, and then subsequent backups only contain the data that changed since a previous backup. So, if the requested data is not stored in the incremental backup selected for boot up, the data will be found in the one of the previous incremental or initial backup, using the links to them, and stored, for example, in an internal backup bitmap.

Note that the I/O filter 410, GUI 408, the handler of BIOS interrupt module 406, the initialization application 404, the backups and the incremental backups can be stored on the other data storage device, or on the two and more data storage devices, and not only on the data storage media 400.

Also note, that the process of booting a computer from a network rather than a local drive or other media can be used. This method of booting can be used by routers, diskless workstations and centrally managed computers. For example, Preboot eXecution Environment can be used, so files/data 402 for booting up a computer system can be stored on the network data storage device. Also, the method can be used by routers, diskless workstations and centrally managed computers. Also note that the hiberfile can be backed up in the backup and can be used during the process of loading from the backup.

A hiberfile is a file that contains data that correspond to all or just necessary operative memory blocks of the computing system and processor settings at a certain moment in time, and can also be stored in the backup. It optionally may contain other hardware settings and disk data. Hiberfile is a system file and may contain the full contents of the system random access memory (RAM). Hibernation is a special kind of shutdown. The system stops all activity, and the hibernation system writes the contents of RAM and some CPU settings to a special file on the hard drive (often called "hiberfil.sys" or similar). When the computer awakens from hibernation, it does not go through a full reboot. Instead, it loads the contents of the hibernation file into memory, and thus restores the exact same condition the hardware system was in, when the hibernation was started, optionally by re-initialization of the hardware. Note that hibernation is supported by all modern operating systems, e.g., Windows, Linux and MacOS.

Figure 5:
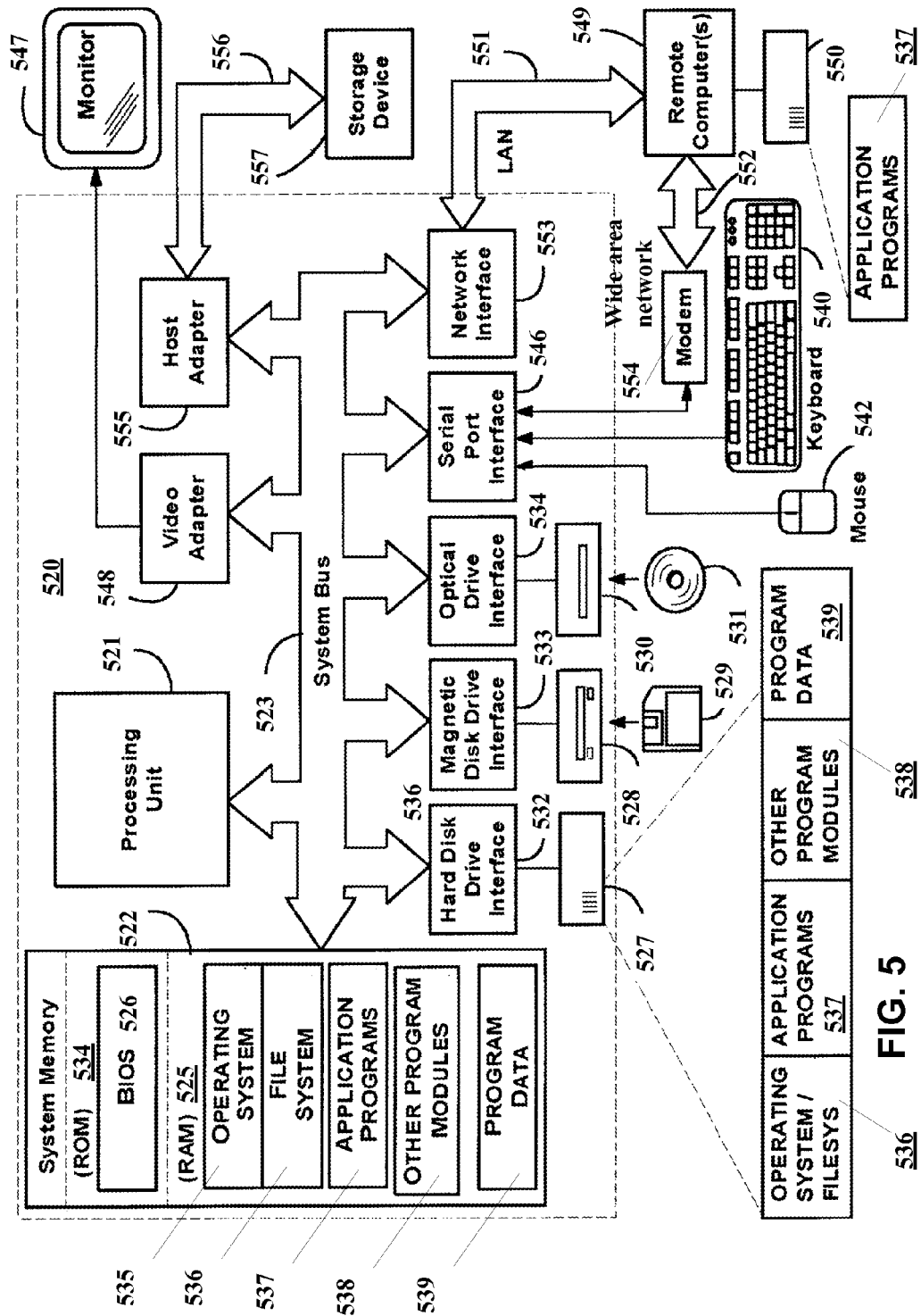
FIG. 5 illustrates an example of a computer architecture that may be used in the present invention.

With reference to FIG. 5, an exemplary system for implementing the invention includes a general purpose computing device in the form of a personal computer or server 520 or the like, including a processing unit 521, a system memory 522, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read-only memory (ROM) 524 and random access memory (RAM) 525. A basic input/output system 526 (BIOS), containing the basic routines that help to transfer information between elements within the personal computer 520, such as during start-up, is stored in ROM 524. The personal computer 520 may further include a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD-ROM, DVD-ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide non-volatile storage of computer readable instructions, data structures, program modules and other data for the personal computer 520. Although the exemplary environment described herein employs a hard disk, a removable magnetic disk 529 and a removable optical disk 531, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 529, optical disk 531, ROM 524 or RAM 525, including an operating system 535 (preferably Windows™ 2000). The computer 520 includes a file system 536 associated with or included within the operating system 535, such as the Windows NT™ File System (NTFS), one or more application programs 537, other program modules 538 and program data 539. A user may enter commands and information into the personal computer 520 through input devices such as a keyboard 540 and pointing device 542. Other input devices (not shown) may include a microphone, joystick, game pad, satellite dish, scanner or the like. These and other input devices are often connected to the processing unit 521 through a serial port interface 546 that is coupled to the system bus, but may be connected by other interfaces, such as a parallel port, game port or universal serial bus (USB). A monitor 547 or other type of display device is also connected to the system bus 523 via an interface, such as a video adapter 548. In addition to the monitor 547, personal computers typically include other peripheral output devices (not shown), such as speakers and printers. A data storage device 557, such as a hard disk drive, a magnetic tape, or other type of storage device is also connected to the system bus 523 via an interface, such as a host adapter 555 via a connection interface 556, such as Integrated Drive Electronics (IDE), Advanced Technology Attachment (ATA), Ultra ATA, Small Computer System Interface (SCSI), SATA, Serial SCSI and the like.

The personal computer 520 may operate in a networked environment using logical connections to one or more remote computers 549. The remote computer (or computers) 549 may be another personal computer, a server, a router, a network PC, a peer device or other common network node, and typically includes many or all of the elements described above relative to the personal computer 520 may further include a memory storage device 550. The logical connections include a local area network (LAN) 551 and a wide area network (WAN) 552. Such networking environments are commonplace in offices, enterprise-wide computer networks, Intranets and the Internet.

When used in a LAN networking environment, the personal computer 520 is connected to the local area network 551 through a network interface or adapter 553. When used in a WAN networking environment, the personal computer 520 typically includes a modem 554 or other means for establishing communications over the wide area network 552, such as the Internet. The modem 554, which may be internal or external, is connected to the system bus 523 via the serial port interface 546. In a networked environment, program modules depicted relative to the personal computer 520, or portions thereof, may be stored in the remote memory storage device. It will be appreciated that the network connections shown are exemplary and other means of establishing a communications link between the computers may be used.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for booting a computer system from backup, the method comprising:

loading an initialization application to run in a single thread mode and that identifies a storage media with the backup that includes boot blocks;

installing and activating a handler of a Basic Input/Output System (BIOS) interrupt module, for intercepting boot loader requests to the storage media, and for redirecting them to the backup;

creating a bitmap of the data blocks stored in the backup and of a writable data storage device to which new data will be written;

initiating the BIOS to load and execute the boot blocks from the backup;

transferring control to a routine defined by a boot record stored in the backup's boot blocks;

installing and activating an I/O filter for intercepting the requests to the writable data storage device, and after a write request is received, the I/O filter writes a corresponding data block to the writable data storage, and marks this data block in the bitmap to indicate that this block is stored on the writable storage device;

after a read request is received, the I/O filter checks the bitmap to see if this data block was not changed, and redirects the read request to the backup to read the data block, and if the requested data block was changed and written to the writeable data storage device, then the I/O filter redirects the read request to the written blocks on the writeable data storage device.

2. The method of claim 1, wherein at least one incremental backup is created from the data blocks written to the writeable data storage device.

3. The method of claim 1, wherein the backup is editable, such that data blocks in the backup are replaceable by substitute data blocks, and new data blocks can be added.

4. The method of claim 1, wherein the writable data storage device and the backup form a single address space and are represented by a virtual data storage.

5. The method of claim 1, further comprising using a graphical user interface to select a backup, out of multiple backups, for booting up.

6. The method of claim 1, wherein the backup is a block-level backup.

7. The method of claim 1, wherein the backup for booting is an incremental backup of the data storage device.

8. The method of claim 1, wherein the backup comprises an operating system.

9. The method of claim 1, wherein the backup comprises a snapshot of the data storage device.

10. The method of claim 9, wherein the snapshot further comprises a hiberfile.

11. The method of claim 1, wherein the booting is performed over a network.

12. The method of claim 1, wherein graphical user interface (GUI) is started by the initialization application to searching and selecting the data storage device(s) with stored backup to boot from.

13. The method of claim 1, wherein computer system service data stored in the backup is updated during the booting.

14. The method of claim 1, wherein the backup is stored on a remote storage device, and the bootup is performed over a network.

15. The method of claim 1, further comprising booting multiple computer systems from the same backup.

16. A computer useable storage medium having computer executable program logic stored thereon for executing on a processor, the program logic implementing the steps of claim 1.

17. A system for migrating execution environment to new hardware or new virtual platform, or in the new operating mode of the same hardware platform, the system comprising:
    a processor;
    a memory; and
    a computer code loaded into the memory and executed on the processor for implementing the steps of claim 1.

* * * * *